(12) United States Patent
Gunter et al.

(10) Patent No.: US 10,733,080 B2
(45) Date of Patent: *Aug. 4, 2020

(54) AUTOMATICALLY ESTABLISHING SIGNIFICANCE OF STATIC ANALYSIS RESULTS

(71) Applicant: International Business Machines Corporation, Armonk, NY (US)

(72) Inventors: Fionnuala G. Gunter, Austin, TX (US); Christy L. Norman Perez, Austin, TX (US); Michael T. Strosaker, Austin, TX (US); George C. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,908

(22) Filed: Jun. 27, 2016

(65) Prior Publication Data

US 2017/0371770 A1    Dec. 28, 2017

(51) Int. Cl.
*G06F 9/44*   (2018.01)
*G06F 11/36*  (2006.01)
*G06F 8/75*   (2018.01)

(52) U.S. Cl.
CPC ............ *G06F 11/3668* (2013.01); *G06F 8/75* (2013.01)

(58) Field of Classification Search
CPC .... G06F 11/3668; G06F 8/75; G06F 11/0715; G06F 11/0718; G06F 11/0757; G06F 11/0766; G06F 11/0769
See application file for complete search history.

(56) References Cited

U.S. PATENT DOCUMENTS

2010/0114840 A1   5/2010 Srivastava et al.
2011/0022551 A1*  1/2011 Dixon ................. G06F 11/3616
                                              706/12

(Continued)

OTHER PUBLICATIONS

Heckman, et al., "A comparative evaluation of static analysis actionable alert identification techniques", PROMISE '13 Proceedings of the 9th International Conference on Predictive Models in Software Engineering, Oct. 9, 2013, 1 page.

(Continued)

*Primary Examiner* — Chat C Do
*Assistant Examiner* — Lenin Paulino
(74) *Attorney, Agent, or Firm* — Alex Harvey (57) ABSTRACT

A static analysis tool configured to determine a significance of static analysis results. The static analysis tool includes computer program code to perform a static analysis of a computer program and generate the static analysis results in response to the performance of the static analysis of the computer program. The program code can further analyze a description of a result item from the static analysis results, and based on the analysis of the description of the result item, assign to the result item information from an ontology scheme. The program code can further include code determine a significance value for the result item in response to the assignment of the information from the ontology scheme and automatically perform an action associated with the result item based on one or more of the information assigned from the ontology scheme or the significance value.

8 Claims, 8 Drawing Sheets

(56) References Cited

U.S. PATENT DOCUMENTS

| | | | |
|---|---|---|---|
| 2013/0219068 A1 | 8/2013 | Ballani et al. | |
| 2014/0026002 A1 | 1/2014 | Haines | |
| 2014/0109062 A1* | 4/2014 | Mahamuni | G06F 11/3616 717/126 |
| 2014/0372988 A1* | 12/2014 | Fanning | G06F 11/3604 717/131 |
| 2015/0067649 A1 | 3/2015 | Baker et al. | |
| 2015/0096022 A1* | 4/2015 | Vincent | G06F 21/566 726/23 |
| 2017/0185667 A1* | 6/2017 | Singh | G06F 21/554 |
| 2017/0220806 A1* | 8/2017 | Munoz | G06F 11/3604 |
| 2017/0371651 A1 | 12/2017 | Gunter et al. | |

OTHER PUBLICATIONS

Tripp, et al., "ALETHEIA: Improving the Usability of Static Security Analysis", CCS '14 Proceedings of the 2014 ACM IGSAC Conference on Computer and Communications Security 2014, 13 pages.

"U.S. Appl. No. 15/433,699 Office Action", dated Sep. 28, 2018, 20 pages.

"U.S. Appl. No. 15/433,699 Final Office Action", dated Apr. 18, 2019, 15 pages.

Gunter et al., "Automatically Establishing Significance of Static Analysis Results", U.S. Appl. No. 16/666,456, Filed Oct. 29, 2019.

IBM, List of IBM Patents or Patent Applications Treated as Related, Oct. 28, 2019, 2 pages.

Unknown, "FindBugs™—Find Bugs in Java Programs", Last updated Mar. 6, 2015, printed Sep. 27, 2019, 5 pages.

Unknown, "Welcome to the FindBugs Eclipse plugin update site", printed Sep. 27, 2019, 1 page.

Chess et al., "Secure Programming With Static Analysis", Software Security Series, 2007, 619 pages.

Unknown, "Static Code Analysis", printed Sep. 27, 2019, 3 pages.

Atollic, "TrueSTUDIO for ARM User Guide", Nov. 2012, 349 pages.

Synopsys, "Coverity Static Analysis", © 2019 Synopsys, Inc, 4 pages.

Carminati et al., "Alice experience using Coverity", presented by Olga Datskova (CERN, ALICE Offline) Ferrara, Apr. 7, 2011, 18 pages.

IBM, List of IBM Patents or Patent Applications Treated as Related, Sep. 30, 2019, 2 pages.

\* cited by examiner

AUTOMATICALLY ESTABLISHING SIGNIFICANCE OF STATIC ANALYSIS RESULTS

BACKGROUND

Embodiments of the inventive subject matter generally relate to the field of computers, and, more particularly, to static analysis tools.

Static analysis tools can analyze computer code from a computer program without having to execute the computer program itself. The results of the static analysis can identify potential issues that may occur in the computer program if the code were to be executed. Static analysis results can identify a variety of different potential issues. Some of the potential issues revealed by the static analysis results may be more serious than others. For example, one potential issue may be related to a memory safety violation (e.g., a buffer overflow). A separate, less serious potential issue, may be an issue whose significance is hard to establish, such as a switch statement fall-through, which is often intentionally coded. However, sifting through static analysis results to find the serious potential issues can be a time consuming process for a developer. Furthermore, without finding the serious potential issues, the computer program may fail upon execution.

SUMMARY

A static analysis tool configured to determine a significance of static analysis results. The static analysis tool can perform operations that include performing a static analysis of a computer program and generating the static analysis results in response to the performing the static analysis of the computer program. The operations can further include analyzing a description of a result item from the static analysis results, and based on the analyzing the description of the result item, assigning to the result item information from an ontology scheme. The operations can further include determining a significance value for the result item in response to the assigning the information from the ontology scheme and automatically performing an action associated with the result item based on the information assigned from the ontology scheme or the significance value.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

As mentioned, static analysis can analyze a computer program before the computer program is executed to attempt to identify a variety of different potential issues. When the static analysis tool analyzes the computer program, it generates individual static analysis results (often referred to as "complaints" or "diagnostic messages") that correspond to each detected potential issue. The individual static analysis result items will be referred to herein as static analysis result items or result items. Some of the potential issues corresponding to result items are more significant than others. For instance, some potential issues have a higher potential for resulting in an error or a serious performance problem if the computer program were to be executed. Current static analysis tools tend to generate a very large proportion of result items that may be less significant (e.g., which may affect the performance of the computer program, but likely would not result in an error or serious performance problem). For example, as a computer program grows in complexity, it becomes more difficult for a developer, or team of developers, to ensure that all of the memory that is allocated throughout the program is freed in the correct location for future use. A failure to deallocate memory is sometimes referred to as a memory leak. The static analysis tool can identify each potential memory leak, which may result in a very large amount of result items that identify memory leaks. However, while it is helpful to know about memory leaks, they may ultimately not result in an actual error when the computer program is executed. One challenge that arises for developers is sifting though all of the less significant result items to find the more significant result items.

Described herein is a static analysis tool that determines significance values for static analysis results utilizing a specific ontology scheme. For example, the tool can assign various potential issue classifications to result items according to a hierarchy of potential issues. The tool may further utilize distribution data associated with the potential issue classifications to determine significance values.

Figure 1:
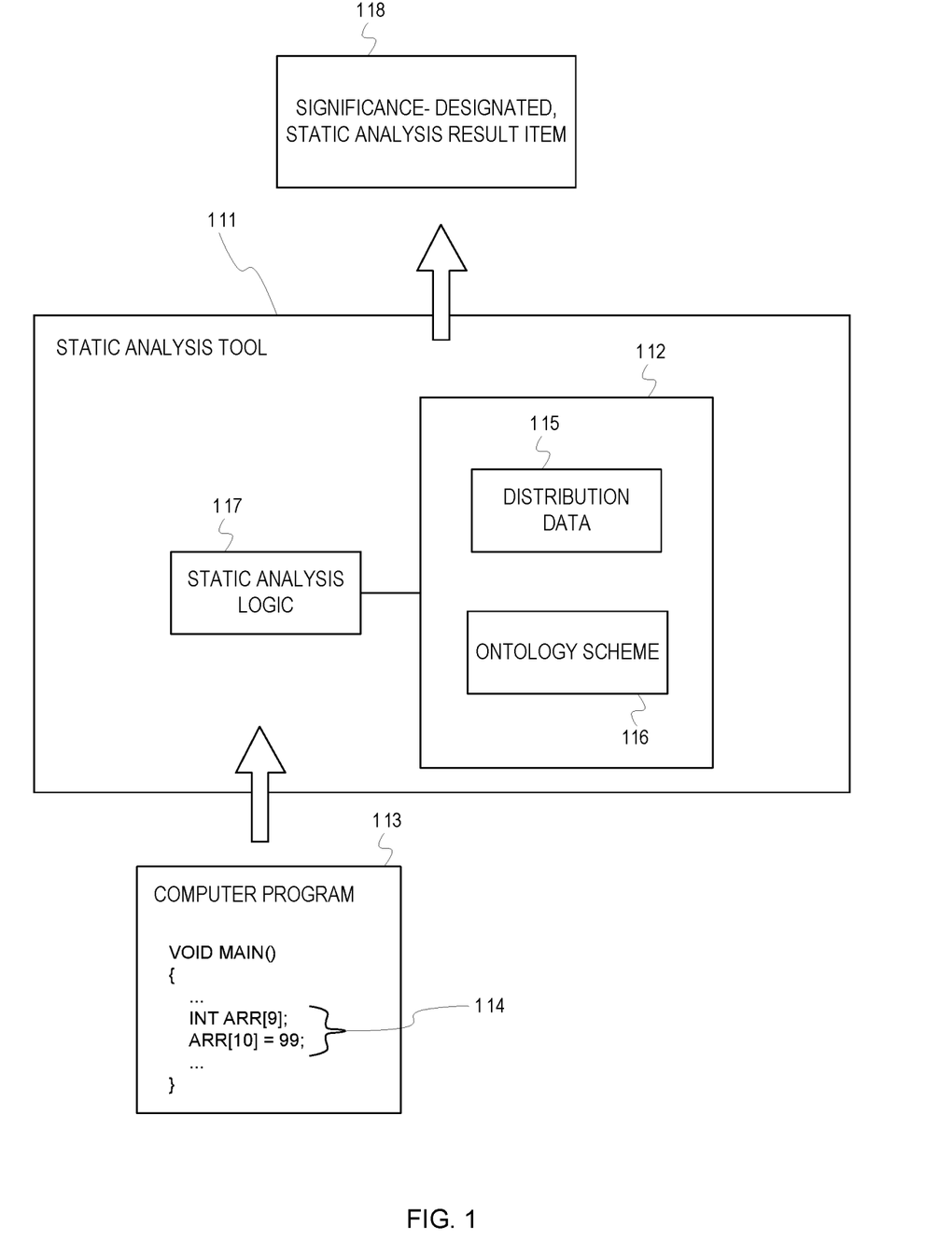
FIG. 1 depicts an example of generating significance-designated static analysis results.

FIG. 1 illustrates an example of generating significance-designated static analysis results. For example, as shown in FIG. 1, a static analysis tool ("tool") 111 accesses a memory unit 112 that stores a computer program 113. The tool 111 analyzes the computer program 113 according to static analysis logic 117. For instance, the tool 111 analyzes a portion of code 114 and generates a static analysis result item ("result item") 118 that corresponds to the portion of code 114.

The tool 111 further assigns to the result item 118 information from the ontology scheme 116. For instance, the tool 111 can assign one or more sets of descriptive terms to the result item 118 according to the ontology scheme 116. For instance, the ontology scheme 116 can include a hierarchy of potential issue classifications that correspond to the descriptive terms. The potential issue classifications can range from a granular description of the potential issue at one end of the hierarchy to a broad description of the potential issue at an opposing end of the hierarchy.

Based on the assignment of the information from the ontology scheme 116, the tool 111 can determine a significance value for the result item 118. For example, the tool 111 can refer to distribution data 115 related to potential issue classifications from the ontology scheme 116. The tool 111 can label, or designate, the result item 118 with the significance value.

The tool 111 can use assigned information and/or determined significance values to provide certain features. For example, based on the assigned information and/or the determined significance values the tool 111 can manipulate presentation of the static analysis results, generate indicators for the results, filter the results, sort the results, report on the results, automatically perform actions to correct the potential issues related to the results, etc.

Figure 2:
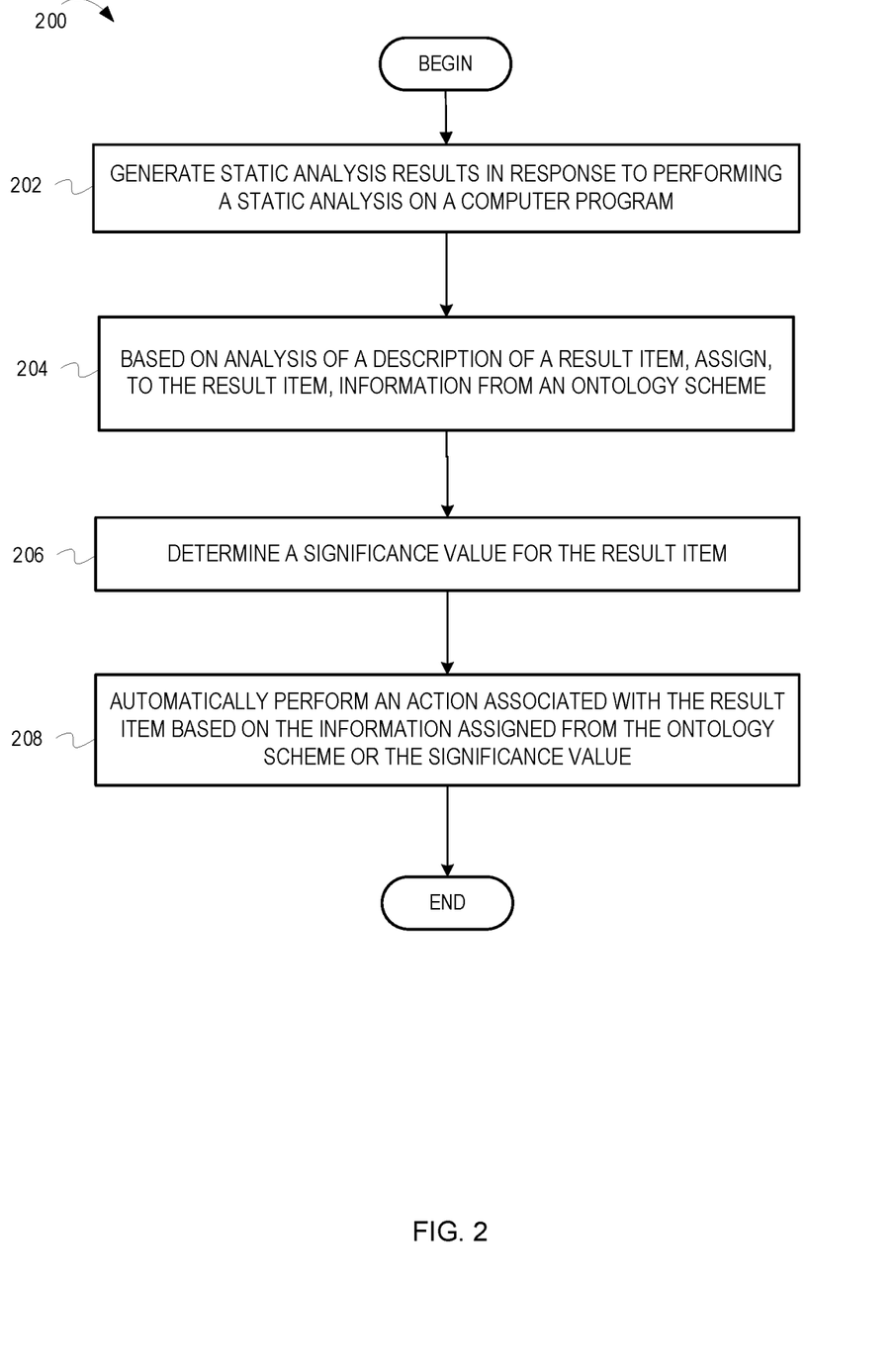
FIG. 2 is a flow diagram 200 of determining a significance of static analysis results based on an ontology scheme.
Figure 3:
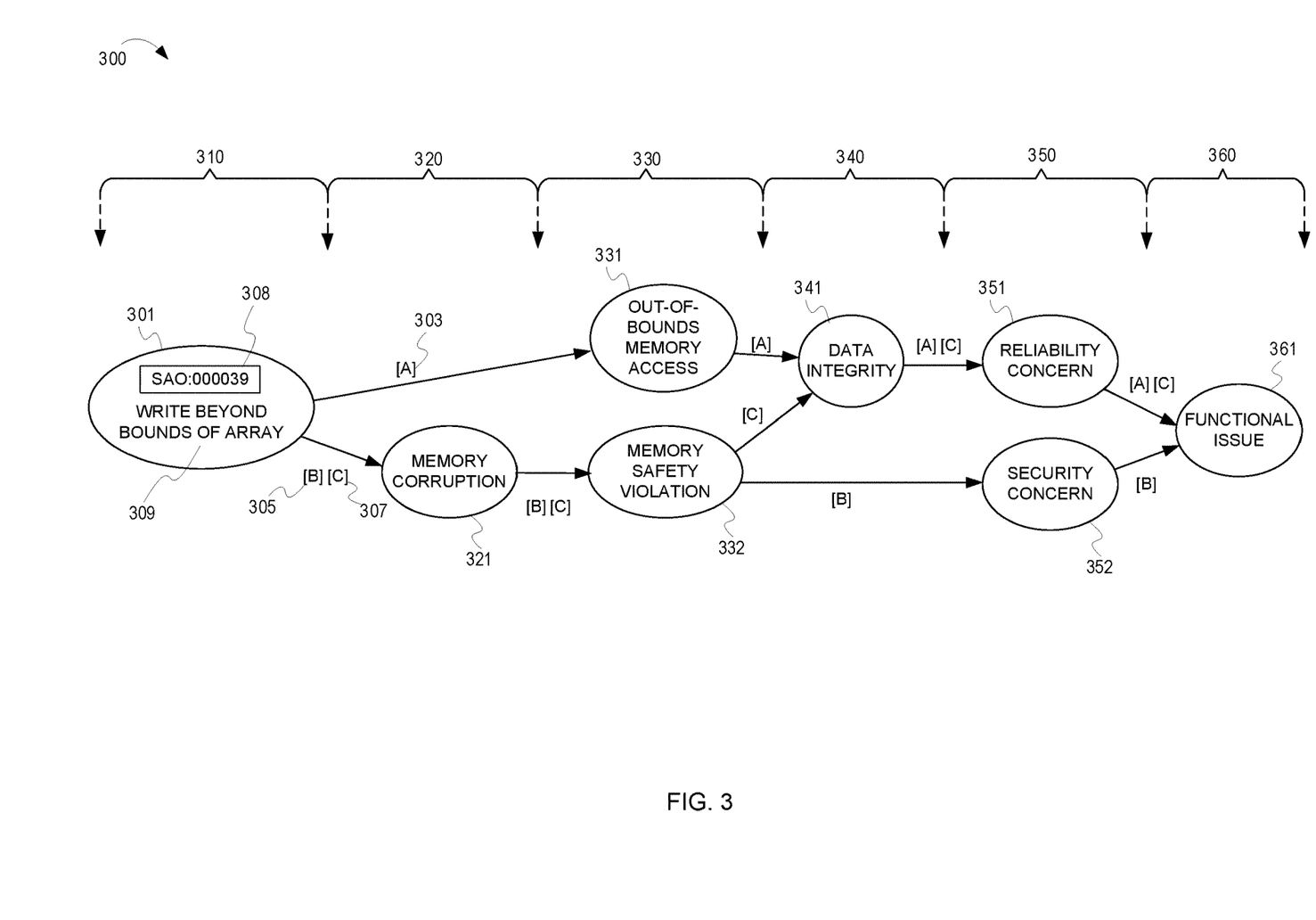
FIG. 3 depicts an example of determining a significance of static analysis results based on a hierarchy of potential issue classifications and specificity levels.
Figure 5:
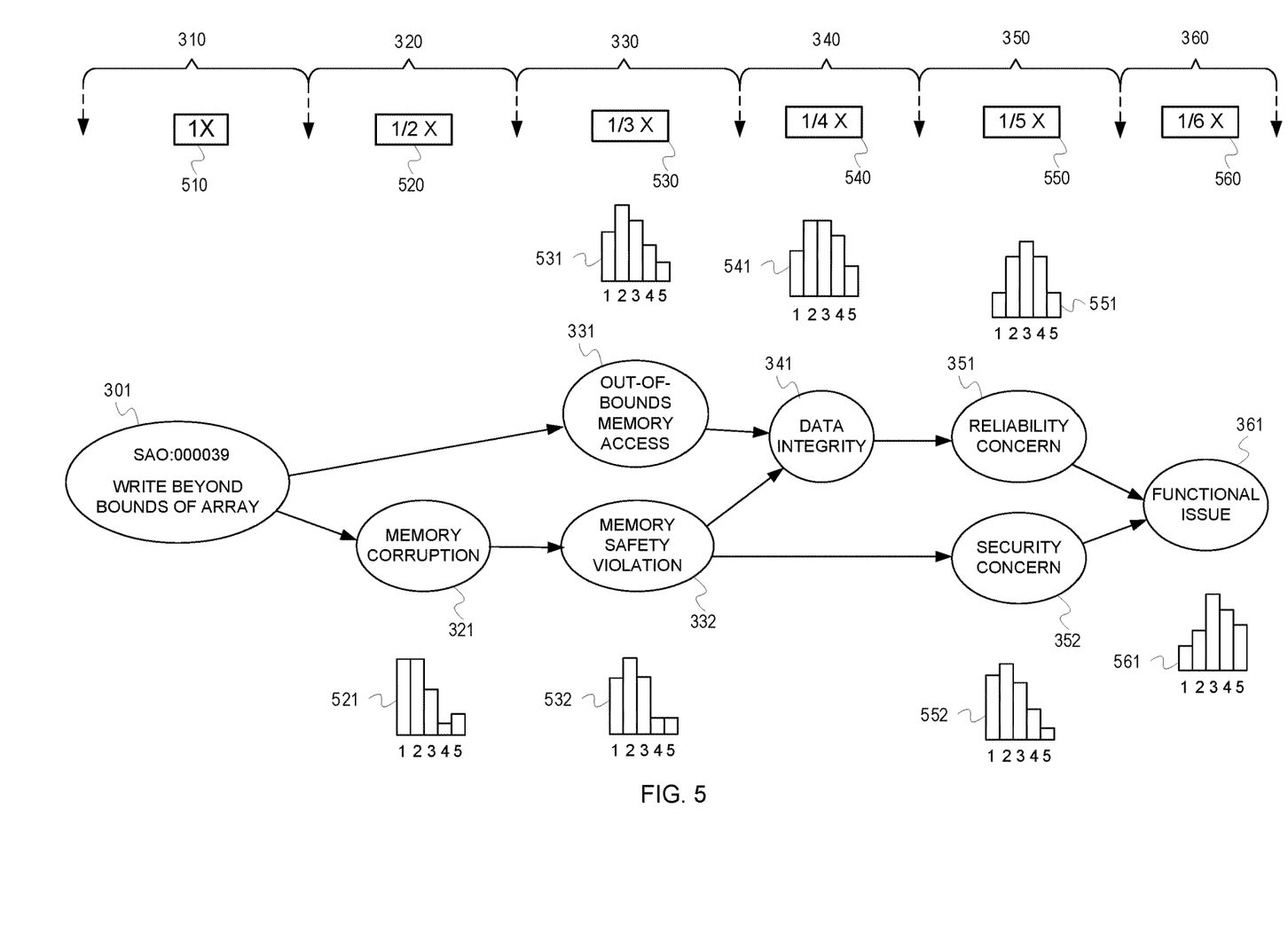
FIG. 5 is an example of determining significance groupings by generating significance value distributions.

FIG. 2 is a flow diagram ("flow") 200 of determining a significance of static analysis results based on an ontology scheme. FIGS. 3 and 5 are described in conjunction with flow 200. In flow 200, at processing block 202, a static analysis tool ("tool") generates static analysis results in response to performing a static analysis on a computer program. For example, as mentioned in FIG. 1, the tool 111 analyzes the portion of code 114 and determines, from the analysis, that the portion of code 114 would result in a problem if executed. FIG. 3 is an example of determining a significance of static analysis results based on a hierarchy of potential issue classifications. In FIG. 3, the tool 111 generates an alphanumeric identifier 308 which corresponds to a buffer overflow potential issue (e.g., the tool 111 determines that the portion of code 114 would write to an eleventh character of a ten-character bound array, which would result in a buffer overflow). The tool 111 assigns a first set of descriptive terms 309 to the alphanumeric identifier 308. The first set of descriptive terms 309 describe the potential issue, such as the phrase "write beyond bounds of array." The first set of descriptive terms 309 is the most granular (i.e., most specific/least broad) descriptive end node in a hierarchy of term sets that get broader in description the further they are from the most granular end node. A set of descriptive terms that describe a potential issue may be referred to herein as a potential issue classification, or more succinctly as a classification.

Referring back to FIG. 2, the flow 200 continues at processing block 204, where the tool, based on analysis of a description of a result item, assigns to the result item information from an ontology scheme. For example, the tool assigns one or more classifications from a hierarchy of potential issue classifications organized according to specificity levels. Referring to FIG. 3, the tool 111 accesses a hierarchy of potential issue classifications (e.g., stored in the ontology scheme 116). The classifications listed in the hierarchy range from specific classifications to more general classifications. The tool 111 references the hierarchy and assigns classifications from the hierarchy to the result item 118, forming a classification structure 300. For example, the tool 111 can assign to the result item 118 a first classification 301 associated with the first set of descriptive terms 309. For instance, because the portion of code 114 is attempting to write beyond the bound of the array, the tool 111 looks up in the hierarchy that the identifier 308 is related to the "write beyond bounds of array" description. The tool 111 then assigns, as the first classification 301, the terms "write beyond bounds of array." The tool 111 then assigns to the result item 118 any additional classifications from the hierarchy in decreasing order of specificity within the hierarchy. The assigning of the result items to the classifications forms classification chains 303, 305, and 307 (e.g., chain 303 is identified by chain tag "[a]," chain 305 is identified by chain tag "[b]," and chain 307 is identified by chain tag "[c]"). The chains 303, 305, and 307 start in a left most position being the most granular level of specificity from the hierarchy and becoming less granular moving to the right in the chains 303, 305, and 307. For example, following chain 305 the tool 111 determines that the first classification 301 (also referred herein as the "write beyond bounds of array" classification) is listed in the hierarchy as an example of a memory corruption classification. Thus, the tool 111 assigns to the result item 118 a second classification 321 using the terms "memory corruption" and/or an associated identifier related to the terms. The tool 111 continues assigning classifications in the hierarchy. For instance, the tool 111 determines that the second classification 321 is an example of a third classification 332 (i.e., a "memory safety violation" classification). The tool 111 further determines that the third classification 332 is an example of a fourth classification 352 (i.e., a "security concern" classification), which is an example of a fifth classification 361 (i.e., a "functional issue" classification). Following chain 303, the tool 111 determines that the classification 301 is also an example of classification 331 (i.e., an "out-of-bounds memory access" classification), which is an example of classification 341 (i.e., a "data integrity" classification), which is an example of classification 351 (i.e., a "reliability concern" classification), which is an example of classification 361. Following chain 307, the tool 111 determines that the first classification 301 is an example of the classification 321, which is an example of classification 332, which is also an example of classification 341, which is an example of classification 351, which is an example of classification 361.

The classifications can be grouped into levels within the structure 319. For example, classification 301 is from a first level 310, classification 321 is from a second level 320, classifications 331 and 332 are from a third level 330, classification 341 is from a fourth level 340, classifications 351 and 352 are from a fifth level, and classification 361 is from a sixth level. The first level 310 is the most granular description of the result item 118. Thus, in some instances, one or more of the first level 310, the classification 301, and/or the identifier 308 may be interchangeably referred to herein as an end node for the classification structure 119 or as the result item 118 itself.

Referring momentarily back to FIG. 2, at processing block 206, the tool determines a significance value for the result item. For example, referring again to FIG. 3, the tool 111 can determine a significance value by prompting a user-input to specify (e.g., annotate) a significance value for the result item. The tool 111 can limit selection of the significance value to a range, such as from one (1) to five (5), with one (1) being the most significant (e.g. most important or most severe) and five (5) being the least significant. The significance value can then be associated with each of the associated classifications. For example, whenever the tool 111 receives a user-specified significance value for a result item, the tool 111 can store in a database an indication of the significance value for each of the classifications 301, 321, 331, 332, 341, 351, 352, and 361. As the significance values are collected over time, the tool 111 can use the data to group certain classifications or certain levels into significance groupings (e.g., high, medium, or low severity/priority groups). The tool 111 can group the classifications and/or levels into the significance groupings by generating significance value distributions for each of the classifications and/or levels.

FIG. 5 illustrates an example of determining significance groupings by generating significance value distributions. As mentioned previously, the tool 111 can associate (e.g. collect and store) past significance values to classifications. The tool 111 can use the past significance values collected for each classification to generate distributions (e.g., distributions 521, 531, 532, 541, 551, 552, and 561), which specify a distribution of the past significance values associated with each classification. Over time, the distributions change as the different ones of the classifications are assigned to different result items. The tool 111 can use the distributions to group the classifications into the significance groupings. For example, as can be seen in FIG. 5, the classification 352 for "security concern" has a distribution that peaks at the significance value of "2." The classification 351 for "reliability concern" has a distribution that peaks at the significance value of "3." Thus, the tool 111 can assign the classification 352 to a "high" significance group, and the classification 351 to a "medium" significance group. Other classifications (not shown), with distributions peaking at "4" or "5" rated significance values, may be grouped into a "low" significance group. Although not shown in FIG. 5, the classification 301 may also have a distribution if it has been encountered before and presented for assignment of significance values.

Figure 4:
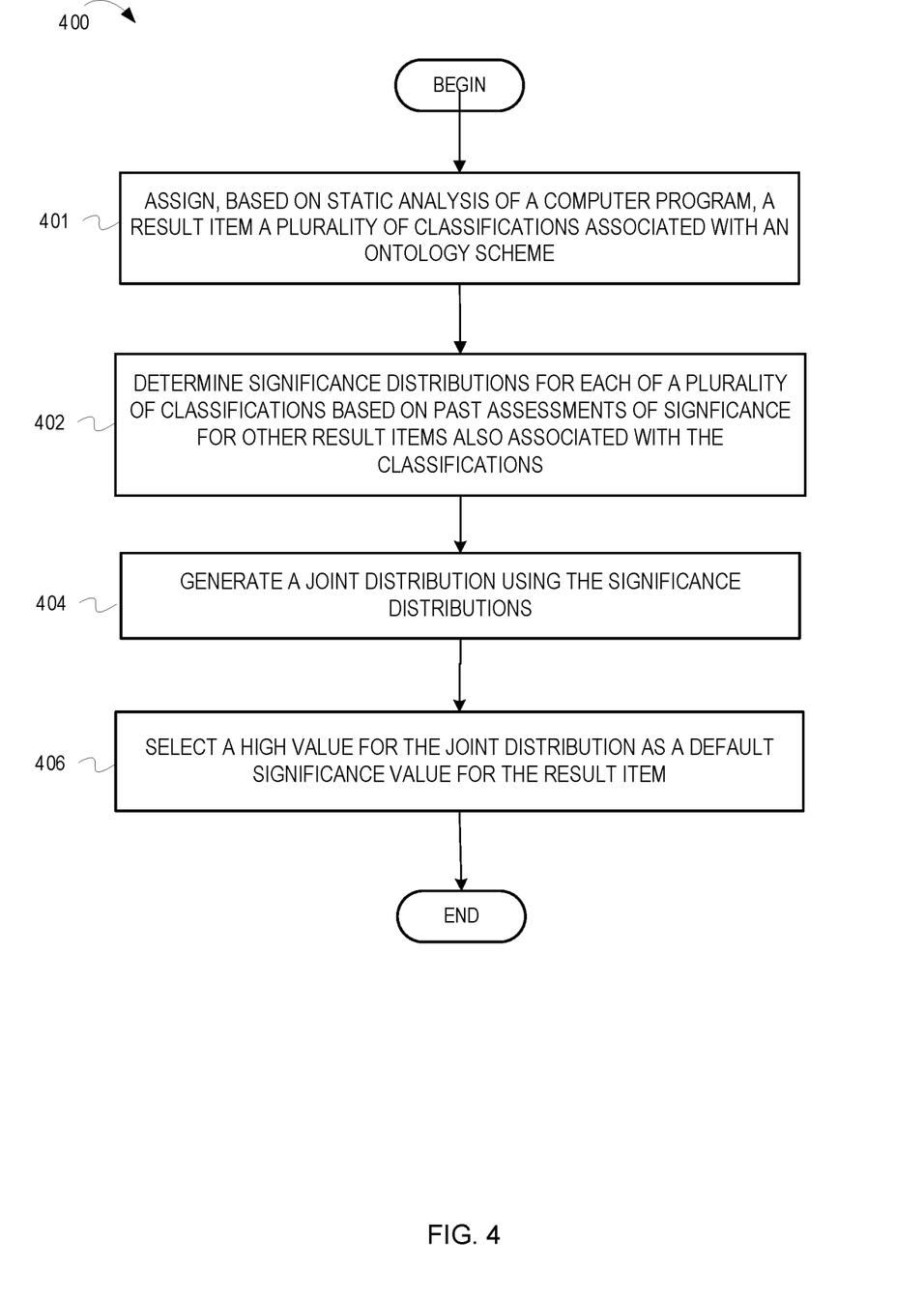
FIG. 4 is a flow diagram 400 of determining a significance value for a static analysis result item based on information associated with potential issue classifications and significance distributions.
Figure 6:
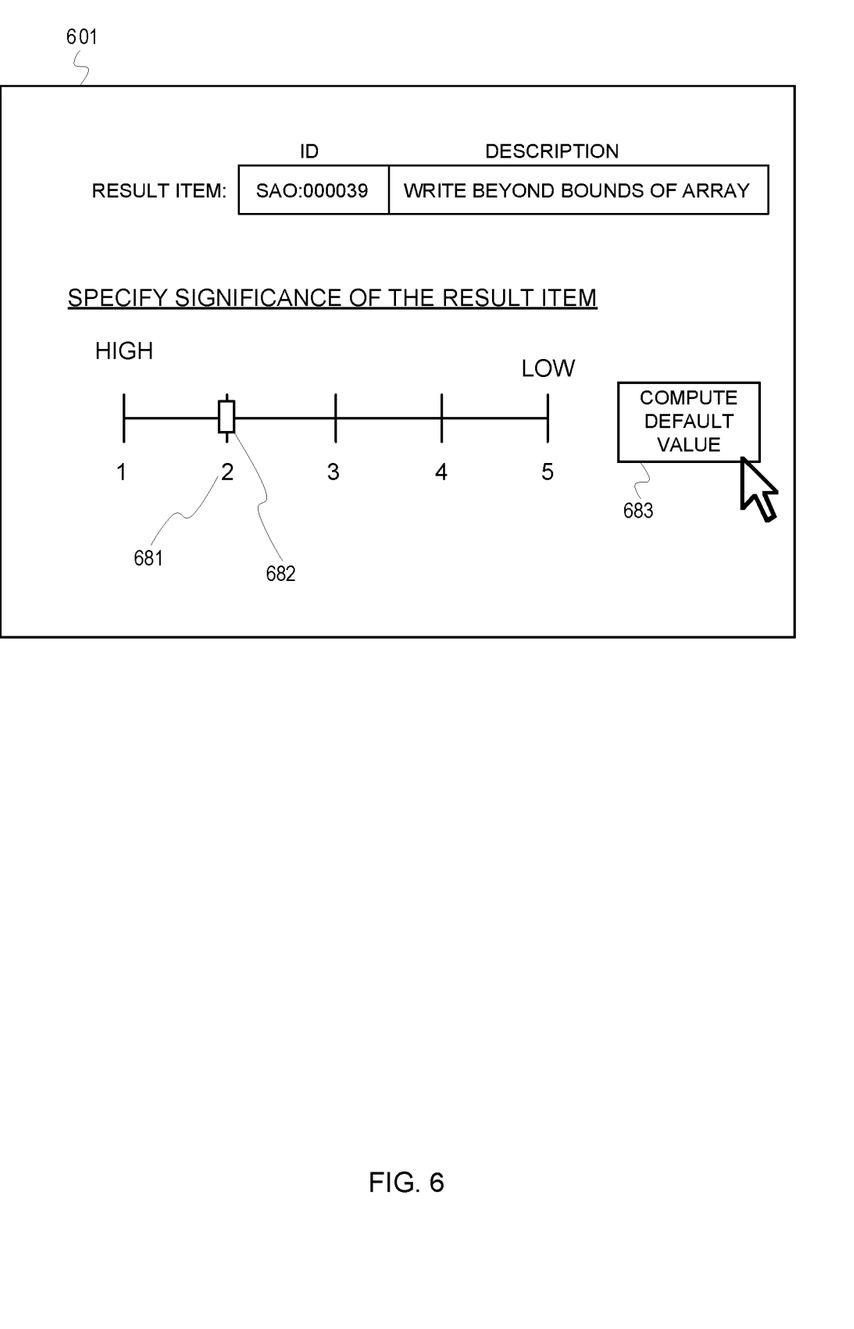
FIG. 6 is an example of generating a default significance value to assign to a static analysis result item.

In another example, the tool 111 can automatically determine a significance value for a result item based on information associated with the classifications, such as by analyzing significance distributions for significance values from past result items that have been associated with the classifications. FIGS. 4, 5 and 6 provide more details regarding examples of determining a significance value for a result item based on information associated with distributions for assigned classifications.

Referring back to FIG. 2, the flow 200 continues at processing block 208, wherein the tool automatically performs an action for the result item based on the information assigned from the ontology scheme and/or based on the significance value. For instance, the tool can generate reports, warnings, etc. that indicate information related to the classifications, specificity levels, significance, etc. In other example, the tool can enact automatic response events to address or resolve potential issues. Referring back to FIG. 3, the tool 111 can detect when one or more of the levels are selected and provide a potential issue report for the one or more selected levels. For instance, if a user selects level 360, the tool 111 may present a report that indicates that result item 118 falls within both classification 351 and classification 352 as being a security concern and a reliability concern. For instance, a "write beyond bounds of array" classification is a security concern because it can result in a buffer overflow, which is a type of security vulnerability. The "write beyond bounds of array" classification is also a reliability concern because it could cause the computer program to crash.

The tool 111 can provide flexibility in selecting a combination of levels, or selecting specific combinations of classifications within one or more of the levels. For instance, the tool 111 can detect if the classification 352 for security concerns is selected, as well as detect if the classification 321 is selected. The tool 111 could then provide a report that sorts or filters the result items to specify result items that are assigned to both the classification 352 and the classification 321 (e.g., potential issues that are both security concerns and memory corruption). In the report, the tool 111 can list the result item 118 at its lowest level of granularity, the classification 301.

In another example, the tool 111 can prioritize automated actions and indicators based on the significance level, such as prioritizing which potential issues to address first. For example, the tool 111 can be customized or configured so that a weighting for a particular classification can be modified, which would cause a report or action performed by the tool 111 to be more prioritized toward the specific classification.

FIG. 4 is a flow diagram ("flow 400") of determining a significance value for a result item based on information associated with classifications and significance distributions. FIGS. 5 and 6 are described in conjunction with FIG. 4. The flow 400 begins at processing block 401 where a static analysis tool ("tool") assigns, based on a static analysis of a computer program, a result item with a plurality of classifications associated with an ontology scheme. An example was previously described in FIG. 3 in association with processing blocks 202 and 204 of FIG. 2.

The flow 400 continues at processing block 402, where the tool determines significance distributions for each assigned classification based on past assessments of significance for other result items also associated with the classifications. An example of determining significance distributions for classifications was described previously in FIG. 5. For instance, the tool 111 can use the past significance values collected for each classification 321, 331, 332, 341, 351, 352, and 361 to generate corresponding distributions 521, 531, 532, 541, 551, 552, and 561, which specify distributions of past significance values associated with each classification. However, if the result item 118 is the first time that the tool 111 encounters such a potential issue, there would be no past significance values collected for the classification 301. For example, in FIG. 6 the tool 111 can present a GUI 601 which prompts for user input to specify a significance value for the result item 118. The prompt may present a GUI input control 682 that the user can manipulate (e.g., a slider), or some other form of user selectable object (e.g., radio buttons) or input element (e.g., a numerical text field). The significance value is one value in a range of values. For example, GUI input control 682 permits the user to select a significance value ranging from the values one (1) to five (5), with one (1) being the most significant and five (5) being the least significant. However, if the result item 118 has not yet been encountered by the tool 111, then then potential issue may be new to the user. Thus, the user may not know what significance value to assign to the result item. Consequently, the tool 111 can present a feature 683 that can be selected to generate a default significance value based on a joint distribution of significance distributions of the classifications that were assigned to the result item 118. One way of doing this can be explained using the information in FIG. 5. Referring momentarily back to FIG. 5, the tool 111 can first determine distributions 521, 531, 532, 541, 551, 552, and 561 of past indications of significance for the classifications 321, 331, 332, 341, 351, 352, or 361. Specifically, using the classification 331 as an example, the tool 111 determines the number of times that the classification 331 has been assigned to past result items and determines what significance values were assigned to the past result items. The tool 111 then generates the distribution 531 as shown in FIG. 5, which indicates that more "2" rated significance values were assigned to result items assigned the classification 331 than other significance values for that classification, followed by "3" rated significance values, then "1"

rated significance values, then "4" rated significance values, and finally "5" rated significance values.

Referring momentarily back to FIG. 4, the flow 400 continues at processing block 404, wherein the tool generates a joint distribution using the significance distributions. The tool can compute the joint distribution by using weight values for the levels of classifications. The weight values can reduce based on a degree of separation of any given level from the most granular level. For instance, as shown in FIG. 5, a weight value 510 for the most granular 310 would give the highest degree of weight (e.g., a weight factor of "1") to a significance value that may have been assigned to the result item, or to past significance values associated with the classification 301. In an example of when the tool (e.g., tool 111) has no previous significance values associated with a classification, the tool 111 would not utilize the weight value 510 in the computation for the joint distribution. Instead, the tool 111 utilizes other weight values 520, 530, 540, 550, and 560. Because the level 320 is closest in distance to the level 310 (which was assigned to the most granular end node of a hierarchy), the weight value 520 is less than the weight value 510 (e.g., level 320 is assigned a weight factor of "½"). Level 330 is assigned a lesser weight value than level 320 (e.g., level 330 is assigned a weight factor of "⅓"). Level 340 is assigned a lesser weight value than level 330 (e.g., level 340 is assigned a weight factor of "¼"). Level 350 is assigned a lesser weight value than level 340 (e.g., level 350 is assigned a weight factor of "⅕"). Level 360 is assigned a lesser weight value than level 350 (e.g., level 360 is assigned a weight factor of "⅙"). The tool 111 can calculate the joint distribution by multiplying the distributions of significance values from any classification by the weight factor associated with the level for that classification, then averaging the resultant distributions. This causes the classifications that are closer to the most granular level to have a greater impact on the joint distribution.

Referring momentarily back to FIG. 4, the flow 400 continues at processing block 406, wherein the tool selects a high value for the joint distribution as a default significance value for the result item. For example, after combining the distributions from each level and factoring their effect on the joint distribution based on weight values, the tool can select a peak value for the joint distribution. The peak value can be the default significance value. For example, in FIG. 6, when the feature 683 is selected, the tool 111 generates the joint distribution using the distributions in FIG. 5. The tool 111 may determine that the peak of the joint distribution is a significance value "2." The tool 111, therefore, may set the input control 682 at a value 681 corresponding to "2." Therefore, the significance value "2" is the default significance value for the result item 118 assigned to the classification 301.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
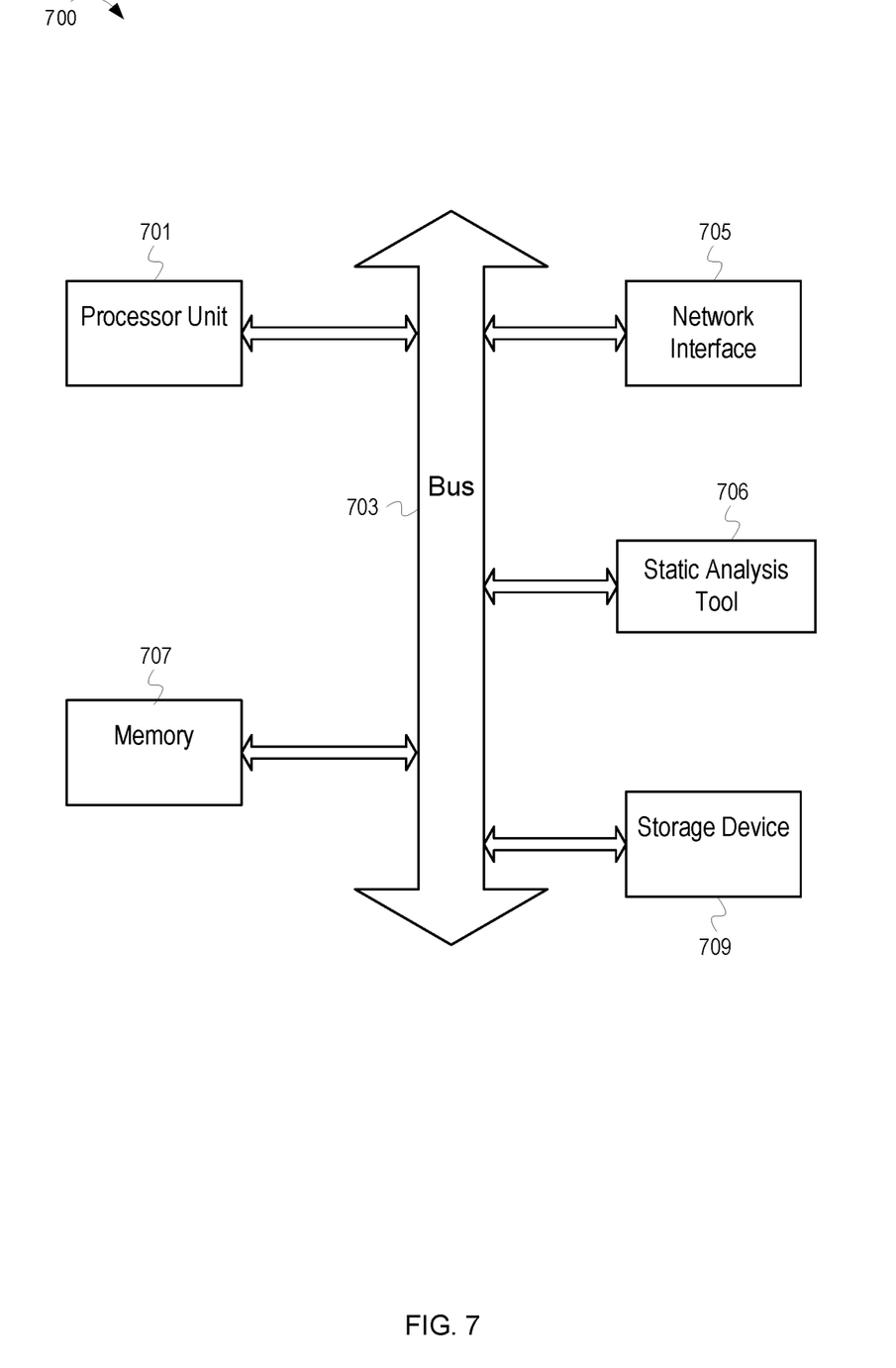
FIG. 7 is an example illustration of a computer system 700.

FIG. 7 is an example illustration of a computer system 700. The computer system 700 includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, Hyper-Transport®, InfiniBand®, NuBus, etc.), a network interface 705 (e.g., an ATM interface, an Ethernet interface, a Frame Relay interface, SONET interface, wireless interface, etc.), and a storage device(s) 709 (e.g., optical storage, magnetic storage, etc.). The memory 707 embodies functionality to implement embodiments described above. The memory 707 may include one or more functionalities that facilitate establishing significance of static analysis results as described above. For example, the memory 707 may include, or have access to, a static analysis tool 706. The static analysis tool 706 establishes significance of static analysis results as described herein. Any one of the functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 709, and the network interface 705 are coupled to the bus 703. Although illustrated as being coupled to the bus 703, the memory 707 may be coupled to the processor unit 701. Some, or all, portions of the computer system 700 may comprise a static analysis tool.

Figure 8:
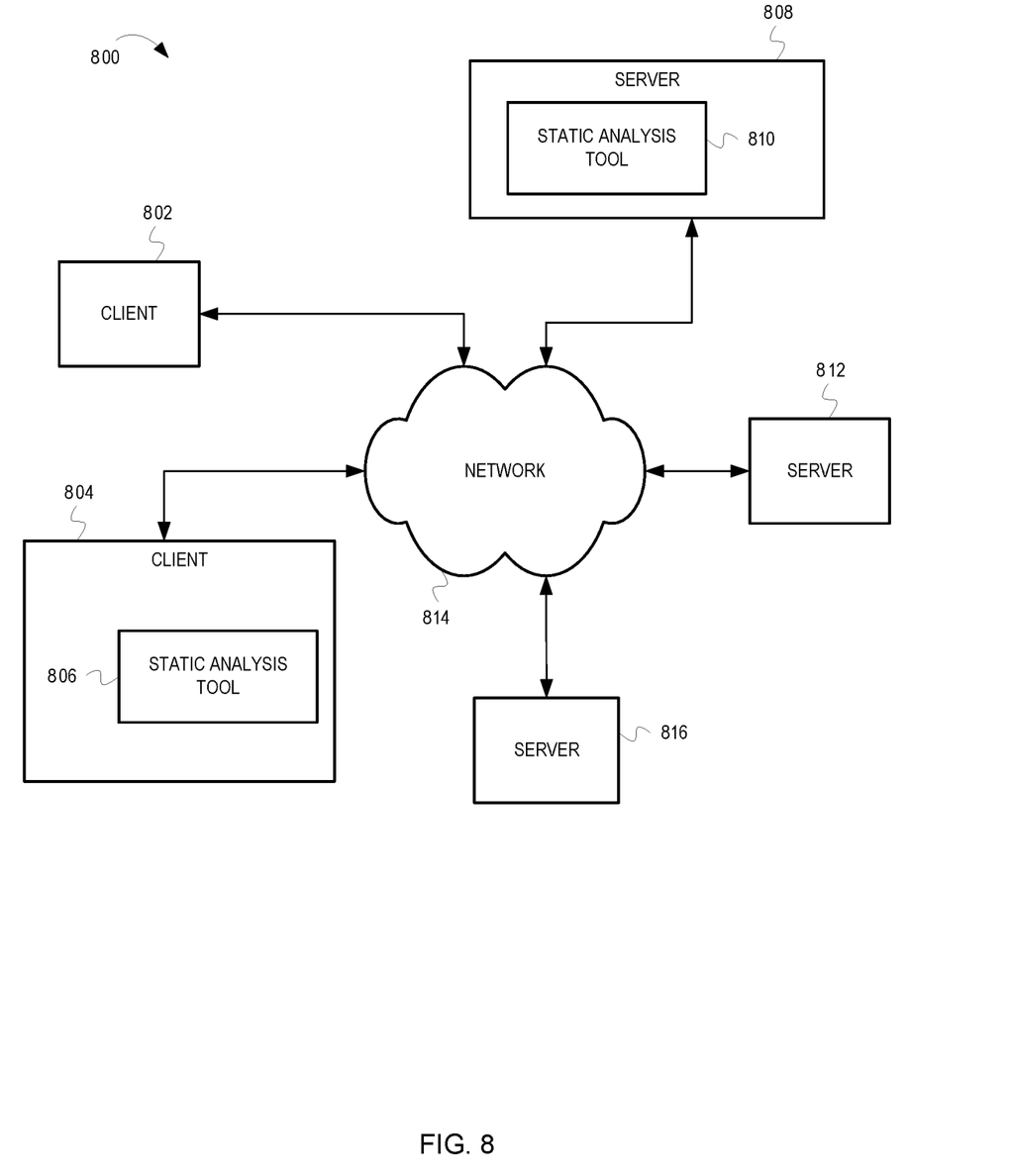
FIG. 8 is a block diagram of an example network environment 800.

FIG. 8 is a block diagram of an example network environment 800, according to some embodiments of the invention. The network environment 800 can include multiple client devices ("clients") 802 and 804 connected to multiple servers 808, 812 and 816 via a network 814. The network 814 can be a local area network (LAN), a wide area network (WAN), a telephone network, such as the Public Switched Telephone Network (PSTN), an intranet, the Internet, or a combination of networks. For simplicity, the network environment 800 shows only two clients 802 and 804 and three servers 808, 812, and 816 connected to the network 814. A static analysis tool (e.g., static analysis tool 806 and/or static analysis tool 810) may be embodied in one or more client machines, possibly including one or more of the clients 802 and 804 or in a server, such as the server 808. According to some embodiments, the static analysis tool (one or more of static analysis tool 806 and/or static analysis tool 810) establishes significance of static analysis results as described herein. In practice, there may be a different number of clients and servers. In addition, in some instances, a client may perform the functions of a server and a server may perform the functions of a client. Any one of the clients 802, 804 and servers 808, 812, and 816 can be embodied as the computer system 700 described in FIG. 7. The clients 802 and 804 can be mainframes, minicomputers, personal computers, laptops, personal digital assistants, or the like. Additionally, the clients 802 and 804 may be capable of connecting to the network 814. The clients 802 and 804 may transmit data over the network 814 or receive data from the network 814 via a wired, wireless, optical, or other connection.

While the embodiments are described with reference to various implementations and exploitations, it will be understood that these embodiments are illustrative and that the scope of the inventive subject matter is not limited to them. In general, techniques for establishing significance of static analysis results as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for determining significance of static analysis results, the computer program product comprising:
 a computer readable storage medium having computer usable program code embodied therewith, the computer usable program code including:
  program code to perform, by a static analysis tool, a static analysis of a computer program;
  program code to generate, by the static analysis tool, static analysis results in response to performance of the static analysis of the computer program;
  program code to analyze, by the static analysis tool, a result item from the static analysis results;
  program code to, based on analysis of the result item, associate the result item with a classification chain that includes a plurality of increasingly broad classifications, wherein each of the plurality of increasingly broad classifications describes a problem that will cause the computer program to malfunction;
  program code to determine, by the static analysis tool, a distribution of significance values for each of the plurality of increasingly broad classifications based on past static analyses for past result items;

program code to determine, by the static analysis tool, a weight for each of the plurality of increasingly broad classifications, wherein the weight decreases as each of the classifications increases in breadth;

program code to determine weighted distributions by multiplying the weight associated with each classification by the distribution of significance values of the classification;

program code to determine an average weighted distribution by averaging the weighted distributions;

program code to select a high value from the average weighted distribution as a significance value for the result item; and program code to automatically perform, by the static analysis tool, an action associated with the result item based on significance value.

2. The computer readable storage medium of claim 1 wherein the program code further includes program code to receive user input indicating the significance values.

3. The computer readable storage medium of claim 2, wherein the significance values were determined before the static analysis of the computer program.

4. The computer readable storage medium of claim 1, wherein the result item is from a first portion of code from the computer program, the program code further including program code to determine the significance value for the result item further based on a distribution of significance values assigned to other instances of the result item that occurred for other portions of code from the computer program.

5. An apparatus comprising:

a processor; and a memory device configured to store instructions, which when executed by the processor cause the apparatus to perform operations for controlling the apparatus, the instructions including:

instructions to perform, by a static analysis tool, a static analysis of a computer program;

instructions to generate, by the static analysis tool, static analysis results in response to performance of the static analysis of the computer program;

instructions to analyze a result item from the static analysis results;

instructions to, based on analysis of the result item, associate the result item with a classification chain that includes a plurality of increasingly broad classifications, wherein each of the plurality of increasingly broad classifications describes a problem with the computer program;

instructions to determine a distribution of significance values for each of the plurality of increasingly broad classifications based on past static analyses for past result items;

instructions to determine a weight for each of the plurality of increasingly broad classifications, where the weight decreases as each of the classifications increases in breadth;

instructions to determine weighted distributions by multiplying the weight for each classification by the distribution of significance values of the classification;

instructions to determine an average weighted distribution by averaging the weighted distributions;

instructions to select a high value from the average weighted distribution as a significance value for the result item; and instructions to automatically perform, by the static analysis tool, an action associated with the result item based on the significance value for the result item.

6. The apparatus of claim 5, wherein the instructions further include instructions to receive user input indicating the significance values.

7. The apparatus of claim 5, wherein the significance values were determined before the static analysis of the computer program.

8. The apparatus of claim 5, wherein the result item is from a first portion of code from the computer program, and the instructions further including instructions to determine the significance value for the result item further based on a distribution of significance values assigned to other instances of the result item that occurred for other portions of code from the computer program.

* * * * *